July 31, 1928.
G. E. MELLIN
1,678,997
IDLER FOR BELT CONVEYERS
Filed Aug. 24, 1922
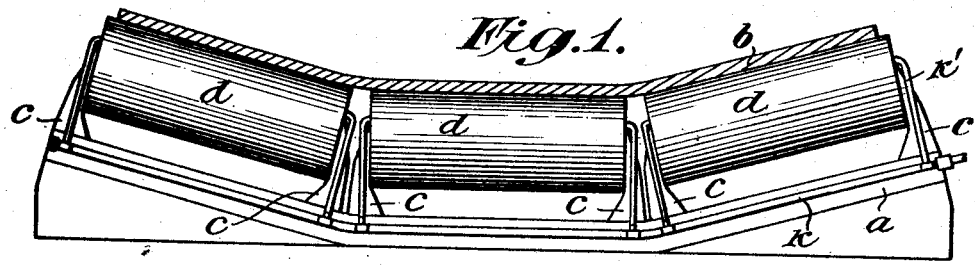
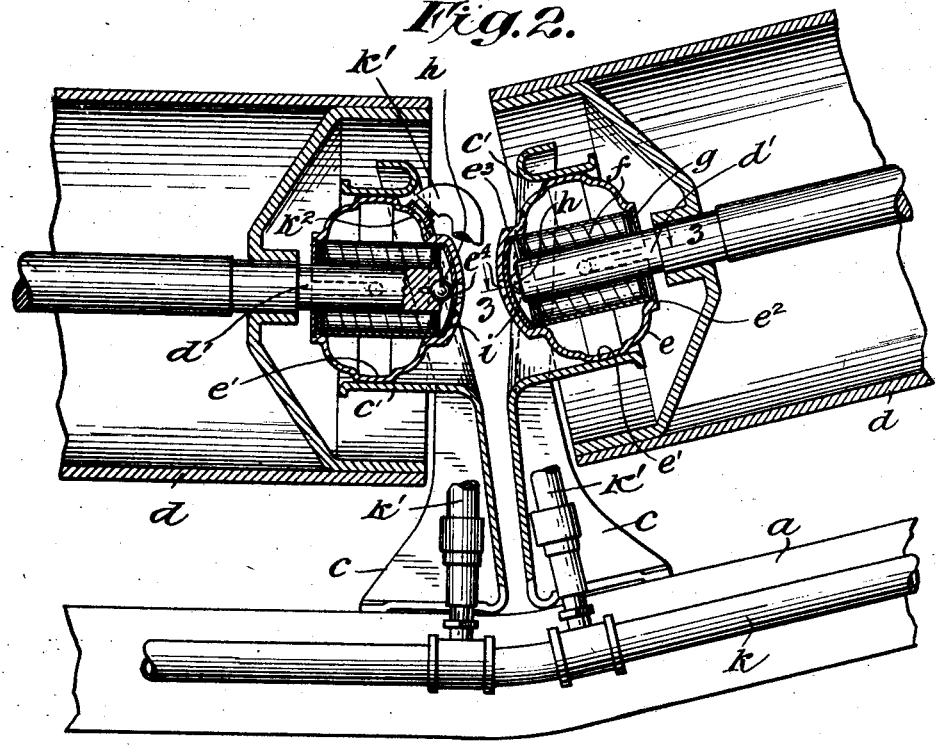
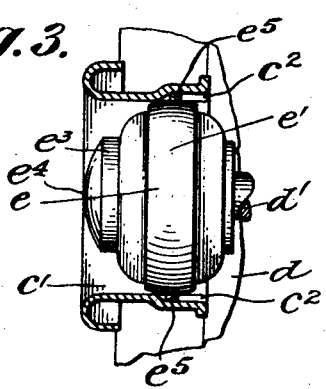
Inventor
George E. Mellin
By his Attorneys Patented July 31, 1928.

1,678,997

UNITED STATES PATENT OFFICE.

GEORGE E. MELLIN, OF NEW YORK, N. Y.

IDLER FOR BELT CONVEYERS.

Application filed August 24, 1922. Serial No. 584,013.

In a co-pending application filed by the present applicant on June 14, 1921, Ser. No. 477,575, there is disclosed and claimed broadly a construction in a belt conveyer in which a self-alining bearing is interposed between the idler roll and its support. By this construction great accuracy in workmanship is unnecessary and the parts may be mounted without requiring undue care or skill on the part of the assembler. In said co-pending application the particular embodiment illustrated showed the proximate idler rolls in rolling contact with the bearing box for each revolving with its roll. Further, lubrication for the bearings was provided through communicating channels within the rolls. While this construction is thoroughly practical and efficient it is sought by the present application to embody the broad invention covered thereby in a modified construction which, in some respects, presents certain advantages in manufacturing and, possibly, in use.

One of the principal objects of the invention is to provide a belt conveyer of the type referred to in which the parts are made of pressed sheet metal and are so constructed and organized as to facilitate their assembling and disassembling. Still another object is to provide for separate lubrication of each of the bearing boxes by means which are positive and insure the certain application of an adequate supply of lubricant to each of the bearing boxes where it will be contained in contact with the bearings. The importance of providing for an adequate lubricating system in a device of this character resides in the necessity of reducing friction to a minimum and in line with this general object of the invention the present embodiment has other features connected with the provision for end thrust which are believed to mark an important advance in the art. Other objects of the invention have to do with the general simplicity of construction and cheapness of manufacture.

Reference is now to be had to the accompanying drawings in which is illustrated the preferred embodiment of the present improvements and in which:

Figure 1 is a view in transverse section through a conveyer embodying the improvements.

Figure 2 is a detailed view in longitudinal section showing a fragment of two adjacent rolls and the bearings therefor.

Figure 3 is a detailed view in elevation of one of the bearing boxes and its supporting bracket showing the means for holding the box against dislodgment.

The base $a$ of the machine, which is preferably of such cross-sectional form as to give the desired troughed effect to the belt $b$ has mounted thereon a series of pressed metal brackets $c$ which, taken in pairs, support the respective idler rolls $d$, preferably three in number. Since all of the parts of the conveyer are of standardized construction and interchangeable it will be sufficient to describe only one of each of the units which may be done most conveniently with reference to Figures 2 and 3. Each bracket $c$ has formed in its upper end an annular support $c'$ for a cylindrical box $e$. The exterior of the box $e$ adjacent its mid-section is of spherical form as indicated at $e'$ so that the box when seated in its annular support $c'$ may have a universal movement with respect thereto and provide the necessary self-alining action between the bearing and the support for the reasons and with the results fully described and claimed in said co-pending application Ser. No. 477,575. In the preferred embodiment the box $e$ is pressed out of a single blank of sheet metal and has one end open as at $e^2$ to receive the bearing $f$ and its cage (which may be of any type). The opposite end of the box may be formed with a cylindrical shoulder as indicated at $e^3$ on which the bearing may be seated and when the bearing is thus positioned the box may be closed by an end plate $g$ pressed into the opening $e^2$. When the idler roll $d$ is mounted in its bearing the end $d'$ of its supporting shaft will extend into the bearings $f$ and, in accordance with the present invention, it is proposed to take up the end thrust thereon by simple and efficient devices which will offer the minimum friction. As shown clearly in Figure 2 such a device comprises a bearing ball which is seated in the end of the shaft $d'$ and on the axis thereof in the opening provided therein to receive the lathe spindle during the machining operations. The metal around the opening in which the ball is seated may be pinched so as to hold the ball $h$ against dislodgment. To take the end thrust transmitted to the ball there is preferably provided a hardened bearing plate $i$ which rests within the shouldered end of the box $e$. This plate is preferably of such form and size as to rest behind the cage for the bearing $f$ and the box $e$ is formed with a co-axial opening $e^4$ in its end wall beyond the plate $i$ so as to permit a knock-out punch to be inserted for the purpose of facilitating the removal of the bearing $f$. For instance, when the plate $i$ is driven inwardly it will dislodge the cage for the bearing $f$ and this will in turn knock-out the end cap $g$ by which the lubricant is confined.

As described, the general organization of parts will be understood. It is evident, however, that some suitable means must be provided to limit the movement of the box $e$ in its support $c'$. Since all of the elements are, in their preferred form, made from pressed sheet metal it will be clear to one skilled in the art that such means may be provided in many different ways as by an arrangement of bolts, eyes, lugs, bosses, dimples, etc. As shown in Figure 3 one simple way includes the pressing out of longitudinal grooves $c^2$ at diametrically opposite points in the annular support $c'$, these grooves extending for any desired distance from one end of the support. For co-operation with these grooves there are pressed out in the bearing box $e$ at diametrically opposite points, bosses $e^5$ which may be introduced into the respective grooves and limit the extent of movement of the box in its support $c'$. This construction will not, of course, interfere with the free universal movement of the bearing box $e$ afforded by its spherical exterior $e'$ on the annular support $c'$. It is this movement, as before described, which provides the self-alignment between the roll and its support in assembling and in use and which makes unnecessary very close work in the manufacture of the parts. It has been found that the most convenient way of assuring an adequate supply of lubricant to the bearings $f$ at all times is through a feed pipe $k$ connected to the respective bearing boxes through separate leads $k'$ which may be flexible, these leads being connected to the respective boxes at $k^2$.

The improvements shown herein include a construction in which the respective rolls are mounted on separate brackets through self-alining bearings and in which each of the bearings is insured an adequate supply of lubricant which is retained in contact with the bearing. Further, the construction insures the minimum amount of friction both as concerns the supporting bearings and the end thrust. It is preferred, as illustrated, to hold the bearing box in its support while the supporting shaft for each roll rotates therein. The parts are of simple and inexpensive construction, may be readily assembled and disassembled and, being of standardized form and interchangeable lend themselves to manufacture on a large scale.

It will be evident as indicated in the co-pending application, Ser. No. 477,575, and from the description herein that one skilled in the art may modify the form and arrangement of the elements and effect a reversal of parts thereof without avoiding the spirit of the invention which is defined in the appended claims.

What I claim is:

1. A pressed metal bearing box for an idler roll having an open end to receive the bearing, a shoulder at the opposite end on which the bearing seats, a bearing plate resting in the box at the last named end and engaged with the bearing and a closing plate pressed in the open end of the box to close the same, said box being provided with an opening at its opposite end back of the said bearing plate for the introduction of a knock-out punch.

2. A pressed metal bearing box for an idler roll having an open end to receive the bearing, a shoulder at the opposite end on which the bearing seats, a closing plate pressed in the open end of the box to close the same and means accessible from the shouldered end of the box for receiving lateral thrust upon the box.

This specification signed this 21st day of August, A. D. 1922.

GEORGE E. MELLIN.